(12) United States Patent
Surdick (10) Patent No.: US 11,554,337 B2
(45) Date of Patent: Jan. 17, 2023

(54) MODULAR LOW PROFILE IN TANK FILTER ELEMENT ASSEMBLY

(71) Applicant: Schroeder Industries, LLC, Leetsdale, PA (US)

(72) Inventor: Scott F. Surdick, Dormont, PA (US)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 569 days.

(21) Appl. No.: 16/674,441

(22) Filed: Nov. 5, 2019

(65) Prior Publication Data

US 2020/0139286 A1    May 7, 2020

Related U.S. Application Data

(60) Provisional application No. 62/755,790, filed on Nov. 5, 2018.

(51) Int. Cl.
| | |
|---|---|
| B01D 46/00 | (2022.01) |
| B01D 46/42 | (2006.01) |
| B01D 35/147 | (2006.01) |
| B01D 25/02 | (2006.01) |
| B01D 35/30 | (2006.01) |
| B01D 35/027 | (2006.01) |

(52) U.S. Cl.
CPC ......... B01D 46/0008 (2013.01); B01D 25/02 (2013.01); B01D 35/147 (2013.01); B01D 35/303 (2013.01); B01D 35/306 (2013.01); B01D 46/0087 (2013.01); B01D 46/4272 (2013.01); B01D 35/027 (2013.01); B01D 2201/345 (2013.01)

(58) Field of Classification Search
CPC ............ B01D 46/0008; B01D 46/0087; B01D 46/4272; B01D 46/2403; B01D 35/02; B01D 35/027; B01D 35/147; B01D 2201/345; B01D 27/103; B01D 27/146; B01D 25/02; B01D 35/303; B01D 35/306
See application file for complete search history.

(56) References Cited

U.S. PATENT DOCUMENTS

| | | | | |
|---|---|---|---|---|
| 4,343,697 | A * | 8/1982 | Miller ................. | B01D 35/147 |
| | | | | 210/90 |
| 7,252,759 | B2 * | 8/2007 | Evanovich ........... | B01D 35/027 |
| | | | | 210/172.6 |
| 2008/0308486 | A1 * | 12/2008 | Hacker ................. | B01D 29/21 |
| | | | | 210/440 |

\* cited by examiner

*Primary Examiner* — Jonathan Miller
*Assistant Examiner* — Gabriel E Gitman
(74) *Attorney, Agent, or Firm* — Blynn L. Shideler; Krisanne Shideler; BLK Law Group

(57) ABSTRACT

A low-profile, large diameter, oval shaped, modular, inside out flow in-tank filter assembly includes at least one filter element having spaced first and second identical endcaps each with a central opening there through and filter media extending between the endcaps. The filter assembly includes a tank bushing coupled to the central opening of one endcap of at least one filter element on one end of the assembly, wherein the tank bushing is configured to mount the inside out flow in-tank filter assembly to a return line within a reservoir. The filter assembly includes a bypass valve coupled to the central opening of one endcap of at least one filter element on one end of the assembly, wherein the bypass valve is configured to allow flow to selectively bypass the filter media of each filter element. Further, each endcap includes a universal alignment and coupling structure around the central opening.

20 Claims, 5 Drawing Sheets

MODULAR LOW PROFILE IN TANK FILTER ELEMENT ASSEMBLY

This application claims priority to U.S. patent application Ser. No. 62/755,790 filed Nov. 5, 2018, entitled "Modular Low Profile Large Diameter In-Tank Filter Element Assembly" which application is incorporated herein by reference in its entirety.

BACKGROUND INFORMATION

1. Field of the Invention

The present invention relates to in tank filter element assemblies and more particularly to a modular low profile in tank filter element assembly.

2. Background Information

In some fluid system designs the reservoirs are becoming non-standard often due to optimization of space requirements of the associated equipment. In tank filter assemblies will also have additional space restrictions based upon the non-standard reservoirs.

One typical requirement for in tank filter assemblies in non-standard reservoir shapes is the need for a low profile filter element design. Low profile can be defined by a ratio of the circumference of the filter element to the total height of the filter element. Within the meaning of this application a Low Profile Filter Element has a ratio of the circumference of the filter element to the total height of the filter element of greater than 6.3, or for a circular filter element the total height is less than the radius. As a comparison, for many conventional filter elements the ratio of the circumference of the filter element to the total height of the filter element is about 2:1. An alternative definition of low profile is where the ratio of the effective surface area of the filter media (generally excludes the endcap) to the effective height of the filter media (generally excludes the height of the endcaps) is greater than or equal to 2500 cm2/in. The ratio is given in these "mixed" units because these are common units for both surface area and filter height in the industry.

There is a need for a cost effective, efficient, low profile in-tank filter element assembly.

SUMMARY OF THE INVENTION

This invention is directed to a cost effective, efficient, low profile in-tank filter element assembly.

As noted above, one parameter defining a Low Profile Filter Element defines an element that has a ratio of the circumference of the filter element to the total height of the filter element of greater than 6.3. The "height of the filter element" is defined between the outer surface of one endcap and the outer surface of the opposing endcap of the filter element and does not include other extraneous structures like the bypass valve. The Low Profile Filter Element of the present invention defines one that has a ratio of the circumference of the filter element to the total height of the filter element of at least 10:1, preferably at least 12:1, and most preferably about 16:1. An alternative definition of low profile is where the ratio of the effective surface area of the filter media (generally excludes the endcap) to the effective height of the filter media (generally excludes the height of the endcaps) is greater than or equal to 2500 cm2/in. The Low Profile Filter Element of the present invention defines one that has a ratio of the effective surface area of the filter media to the effective height of the filter media at least 2500 cm2/in, and preferably at least 4500 cm2/in.

One aspect of the invention provides a low-profile inside out flow in-tank filter assembly comprising at least one filter element having spaced first and second endcaps each with a central opening there through and filter media extending between the endcaps, wherein a ratio of the circumference of each filter element to the total height of the filter element from an outer surface of one endcap to the outer surface of the spaced endcap is at least 10:1; a tank bushing coupled to the central opening of one endcap of at least one filter element, wherein the tank bushing is configured to mount the inside out flow in-tank filter assembly to a return line within a reservoir; and a bypass valve coupled to the central opening of one endcap of at least one filter element, wherein the bypass valve is configured to allow flow to selectively bypass the filter media of each filter element One aspect of the present invention provides a modular inside out flow in-tank filter assembly including at least one filter element having spaced first and second identical endcaps each with a central opening there through and filter media extending between the endcaps, wherein each endcap includes a universal alignment and coupling structure around the central opening, including coupling clips configured to engage with an adjacent universal alignment and coupling structure, clip ridge configured to receive and engage with coupling clips of an adjacent universal alignment and coupling structure, and seal receiving surface configured to receive a seal around the central opening and between adjacent universal alignment and coupling structures.

One aspect of the present invention provides a bypass valve for an inside out flow filter assembly including a bypass seat with a universal alignment and coupling structure around a central opening, including coupling clips configured to engage with an adjacent universal alignment and coupling structure, clip ridge configured to receive and engage with coupling clips of an adjacent universal alignment and coupling structure, and seal receiving surface configured to receive a seal around the central opening and between adjacent universal alignment and coupling structures, and wherein the bypass seat includes a peripheral radial outlet; a cup shaped bypass dish selectively closing the peripheral radial outlet of the seat, and having a annular bypass valve operational area upon which pressure within the filter assembly is acting on the bypass dish to move the dish from closing the peripheral radial outlet; a bypass cover; and springs acting upon the cup shaped bypass dish biasing the dish toward selectively closing the peripheral radial outlet of the seat.

These and other advantages of the present invention will be described below in connection with the attached figures.

BRIEF DESCRIPTION OF THE PREFERRED EMBODIMENTS

This invention is directed to low-profile, large diameter, oval shaped, modular, inside out flow in-tank filter assembly 20 including at least one filter element having spaced first and second identical endcaps 30 each with a central opening 32 there through and filter media 40 extending between the endcaps 30, wherein a ratio of the circumference of each filter element to the total height of the filter element from an outer surface of one endcap 30 to the outer surface of the spaced endcap 30 is at least 10:1, preferably at least 12:1, and most preferably about 16:1.

Another measure of low-profile is a ratio of the effective surface area of the filter media 40 (excludes the endcaps 30 and portions of the filter media 40 covered by the outer flanges of the endcaps 30 in this measurement of effective surface area) to the effective height of the filter media 40 (excludes the height of the endcaps 30 and that of filter media 40 covered by the endcap outer flanges). Low profile within the meaning of this application is >2500 cm2/in, with the low-profile, large diameter, oval shaped, modular, inside out flow in-tank filter assembly 20 of the present invention as disclosed exceeding 4500 cm2/in, specifically 4877 cm2/in.

The filter assembly 20 includes a tank bushing 70 coupled to the central opening 32 of one endcap 30 of at least one filter element on one end of the assembly 20. The tank bushing 70 mounts the inside out flow in-tank filter assembly 20 to a return line 12 within a reservoir 10 below a top 14.

The filter assembly 20 includes a bypass valve 50 coupled to the central opening 32 of one endcap 30 of at least one filter element on one end of the assembly 20. The bypass valve 50 is configured to allow flow to selectively bypass the filter media 40 of each filter element, when the media blinds. Further, each endcap 30 includes a universal alignment and coupling structure around the central opening 32, including coupling clips 34 configured to engage with a clip ridge 36 of adjacent universal alignment and coupling structure. The universal alignment and coupling structure includes a clip ridge 36 configured to receive and engage with coupling clips 34 of an adjacent universal alignment and coupling structure, and a seal receiving surface configured to receive a seal 42 around the central opening 32 and between adjacent endcaps 30 (or other structure) surrounding the universal alignment and coupling structures.

Figures 1, 2:
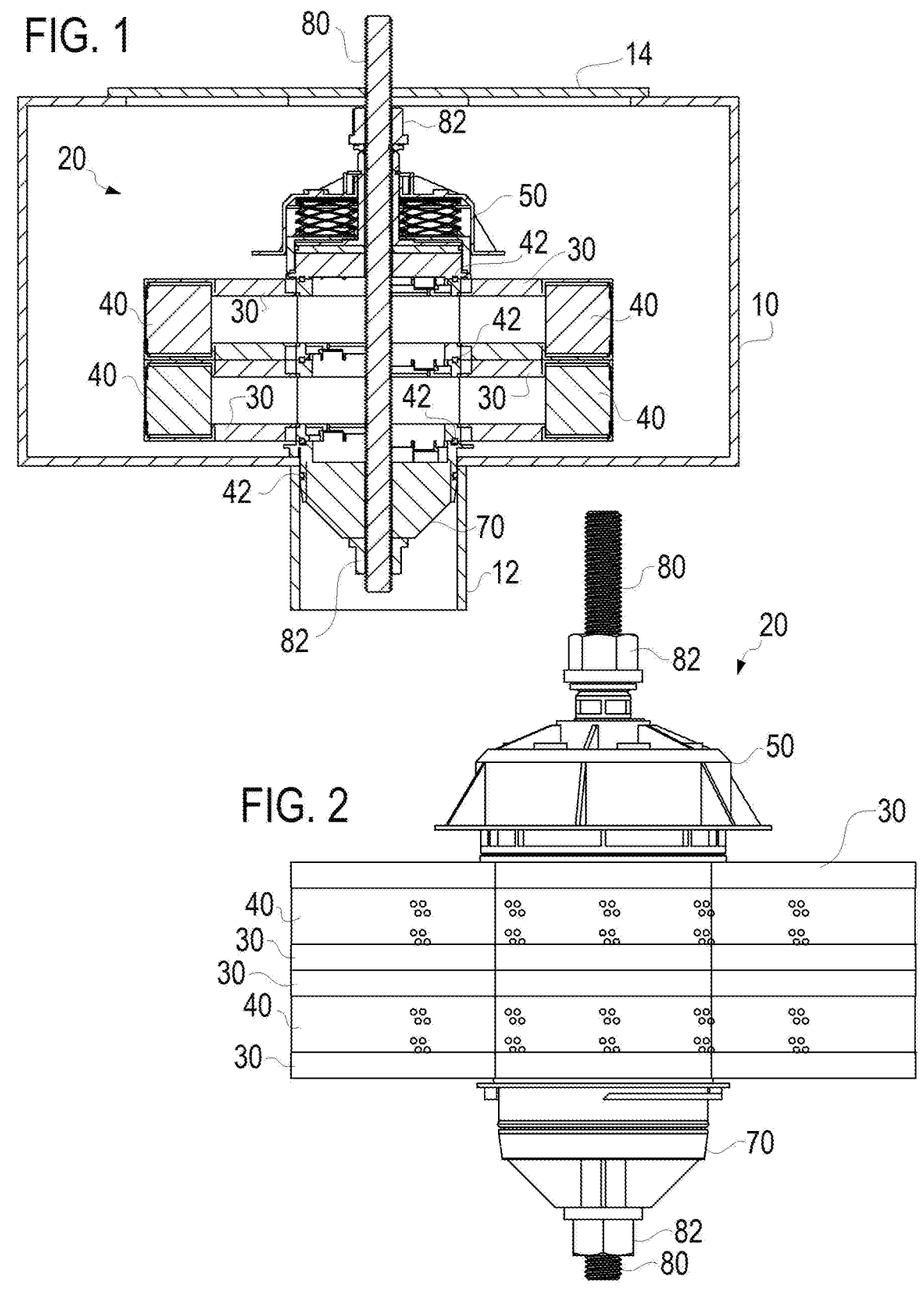
FIG. 1 is a side elevation sectional view of a modular, low-profile inside out flow in-tank filter assembly according to one aspect of the invention mounted in a bottom inlet of a reservoir.
FIG. 2 is a side elevation sectional view of the modular, low-profile inside out flow in-tank filter assembly of FIG. 1.
Figure 10:
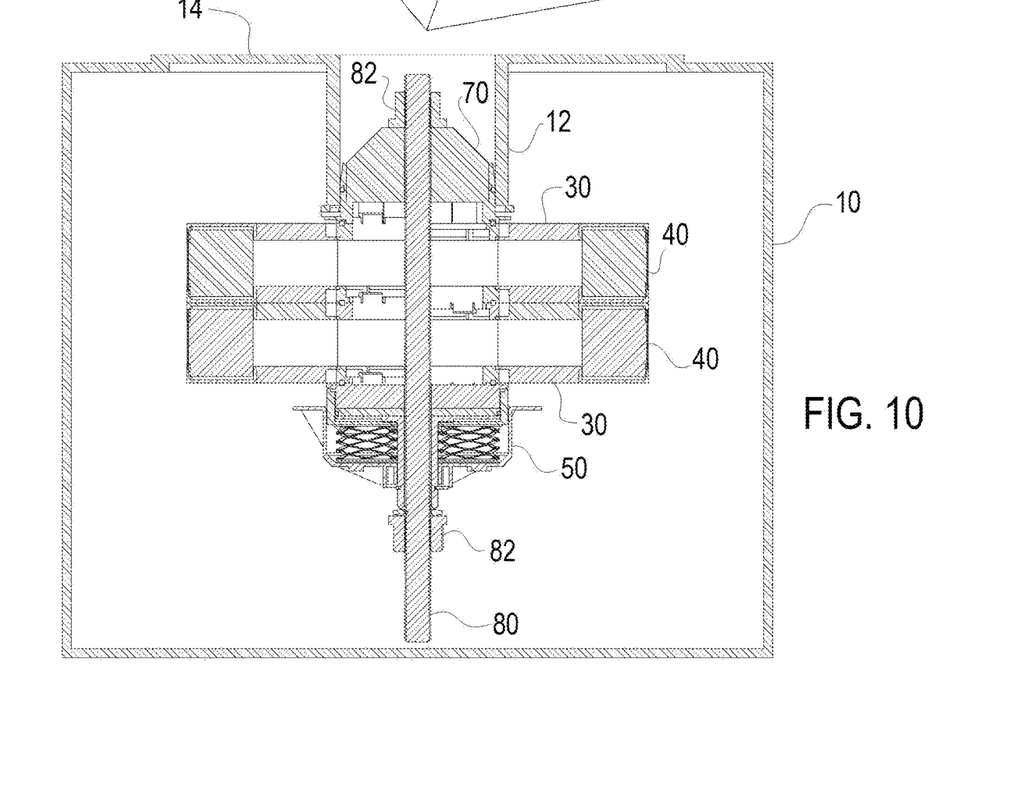
FIG. 10 is a sectional view of a modular, low-profile inside out flow in-tank filter assembly according to one aspect of the invention mounted in the reservoir of FIG. 9.

One embodiment of the low-profile, large diameter, oval shaped, modular, inside out flow in-tank filter assembly 20 according to this invention mounted in a lower return line of a reservoir 10 is shown in FIGS. 1-2 and 10. The low-profile inside out flow in-tank filter assembly 20 according to the invention is modular in which one, two, three or even more filter elements are stacked to obtain the desired flow characteristics for a given reservoir 10. The embodiment shown below has two of the filter elements, with the filter elements coupled together, as discussed below.

The low-profile inside out flow in-tank filter assembly 20 according to the invention includes a tie-rod 80 extending through the center of the assembly 20 with locknuts 82 on each tie-rod 80 end to secure the assembly components together. The assembly 20 as shown is designed for use in the reservoir 10 without a separate filter element housing.

Figure 3:
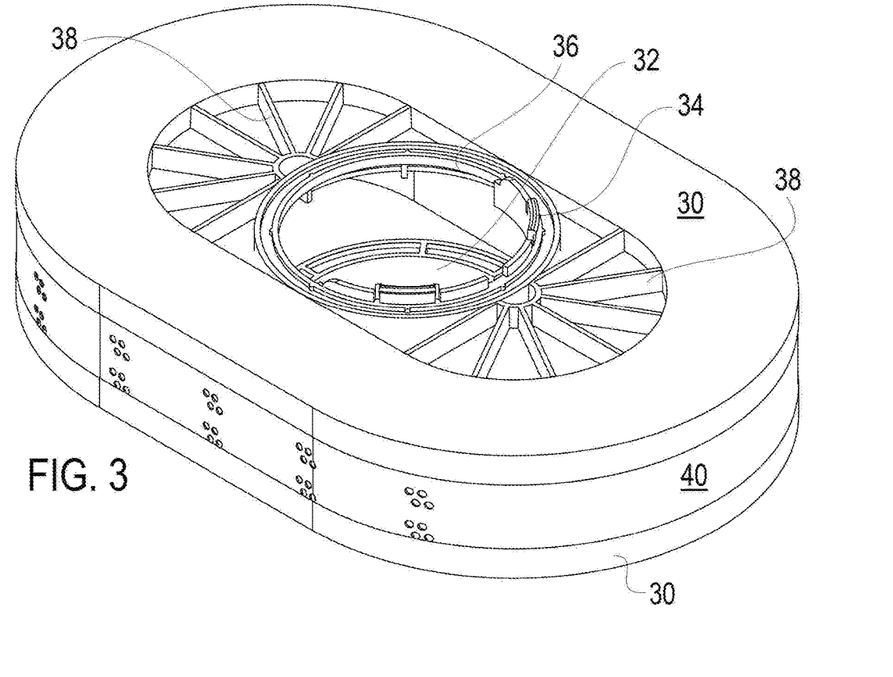
FIG. 3 is a perspective view of a single filter element stack of the modular, low-profile inside out flow in-tank filter assembly of FIG. 1.
Figure 4:
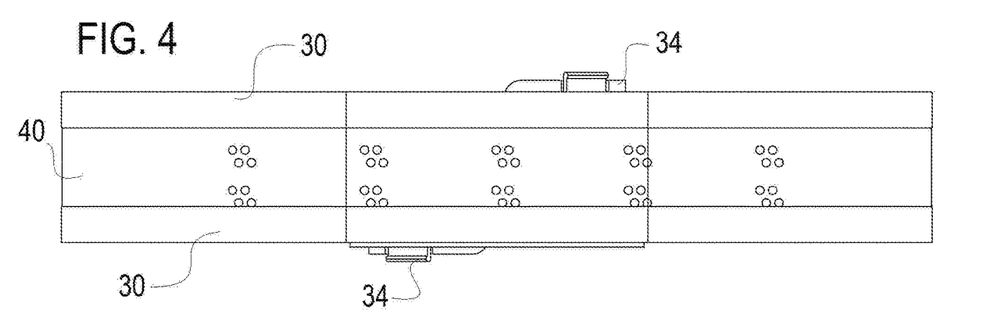
FIG. 4 is a side elevation view of a single filter element stack of FIG. 3.

The two filter element embodiment of the low-profile, large diameter, oval shaped, modular, inside out flow in-tank filter assembly 20 according to this invention is shown separately in the elevational side view of FIG. 2. A single filter element of the invention is shown in perspective and side elevational and sectional views of FIGS. 3-5. Each filter element has spaced first and second identical endcaps 30 each with a central opening 32 there through and filter media 40 extending between the endcaps 30. A ratio of the circumference of each filter element to the total height of the filter element from an outer surface of one endcap 30 to the outer surface of the spaced endcap 30 is at least 10:1, preferably at least 12:1, and most preferably about 16:1. Specifically the endcap 30 and the filter element exhibits an oval shape (in top plan view) measuring about 8.5" across and 13" in length. This size equates to a "large diameter" filter assembly in the art. More precisely the shape is two 8.5" diameter semicircles on the ends with 4.5" straight lands connecting the two ends. The term about means +/−10% within this application. The total height of the filter element from an outer surface of one endcap 30 to the outer surface of the spaced endcap 30 is 2.25 inches. Additionally of interest is the inner spacing or effective height of the media 40, which is 1.17" measured between an inner surface of one endcap 30 to the inner surface of the spaced endcap 30 (excluding the portions of the filter media 40 covered by an outer flange of the endcap 30) and the effective area of the media 40 is 5707 cm2.

Figure 5:
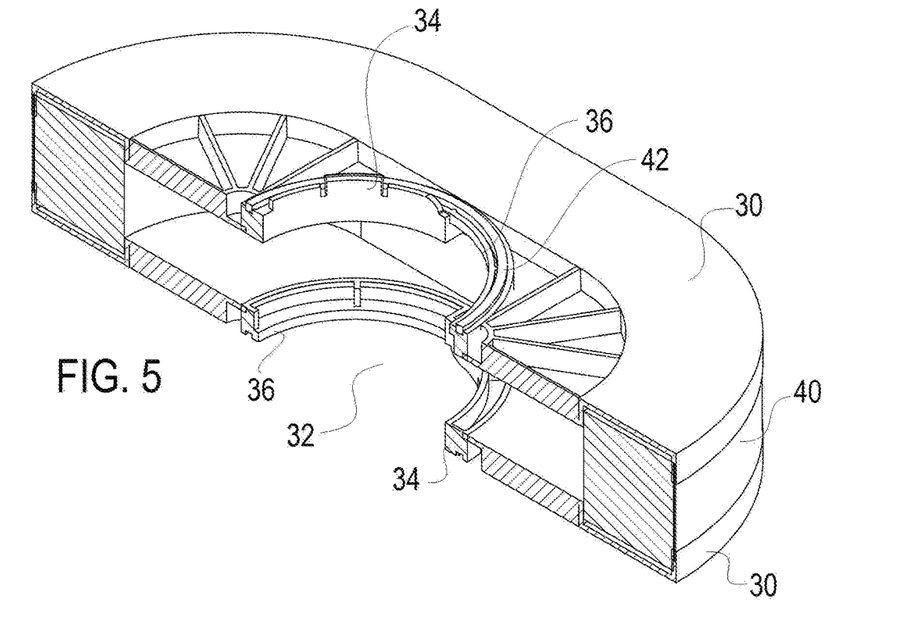
FIG. 5 is a perspective sectional view of a single filter element stack of FIG. 3.

The filter media 40 extending between the endcaps 30 is best illustrated in FIG. 5. In this embodiment the media 40 is a micro glass media (6 layer arrangement) with a media outer wrap (such as E-media outer wrap from the applicant Schroeder industries). The construction of the media 40 may be tailored to the specific application for the assembly 20.

Preferably each endcap 30 is identical and may be easily formed as a one piece injection molded structure. The use of identical endcaps 30 greatly decreases molding costs. As discussed above the plan view (top view) shape of each endcap 30 is an oval shape measuring about 8.5" across and 13" in length. More precisely the shape is two 8.5" diameter semicircles on the ends with 4.5" straight portions connecting the two ends. As shown the endcap 30 can include a plurality of supporting ribs 38 for strength. Specifically an outer raceway of ribs 38 on an inner surface extending between a central depression and an outer wall, and two sets of inner radial ribs 38 within the depression on an outer surface of the endcap. The outer wall may also include a plurality of undercut holes mainly to improve epoxy adhesion. The ribs 38 will also improve epoxy coupling.

Each endcap 30 includes a universal alignment and coupling structure around the central opening 32 of the endcap. The universal alignment and coupling structure includes coupling clips 34 configured to engage with an adjacent universal alignment and coupling structure, clip ridge 36 configured to receive and engage with coupling clips 34 or 54 or 74 of an adjacent universal alignment and coupling structure, and seal receiving surface configured to receive a seal 42 around the central opening 32 and between adjacent structures. The universal alignment and coupling structure is referenced as universal because it but can couple to identical universal alignment and coupling structures, generally pivoted so that the clips 34 and ridges 36 align. The seal receiving surfaces of adjacent universal alignment and coupling structures are axially aligned grooves for receiving an axially compressed square ring seal 42 therein as shown. The universal alignment and coupling structure mainly aligns the components together during assembly and is not needed to provide a clamping force holding the elements together, as the clamping and holding and sealing force is provided by the tie rod 80 and fastening nuts 82. The universal alignment and coupling structure simply maintains alignments and holds the components together mainly for assembly of the unit 20.

Figure 6:
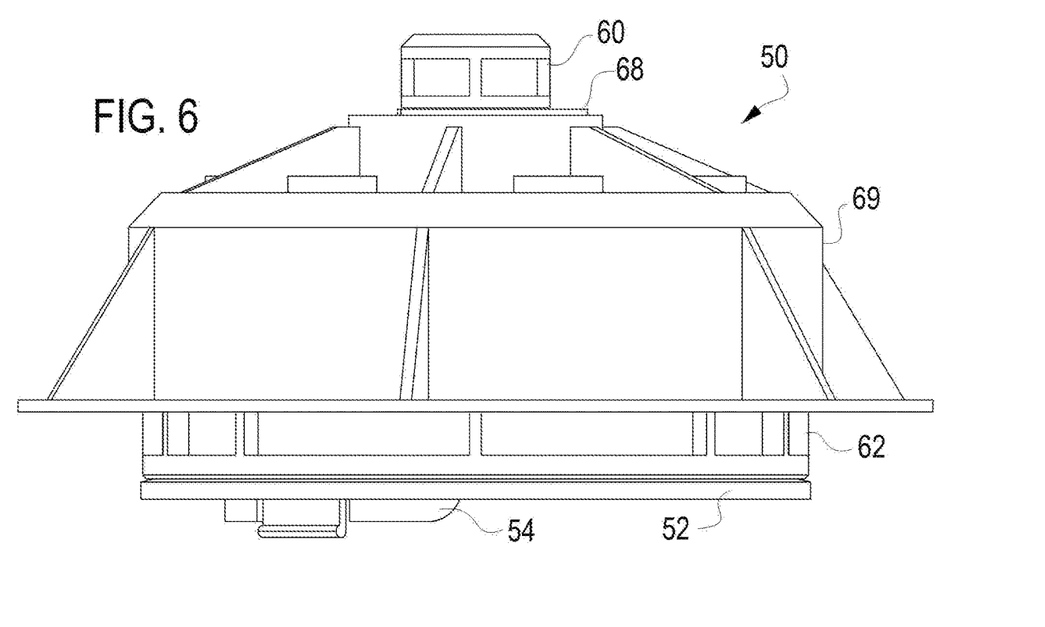
FIG. 6 is a side elevation view of the bypass valve of the modular, low-profile inside out flow in-tank filter assembly of FIG. 1.
Figure 7:
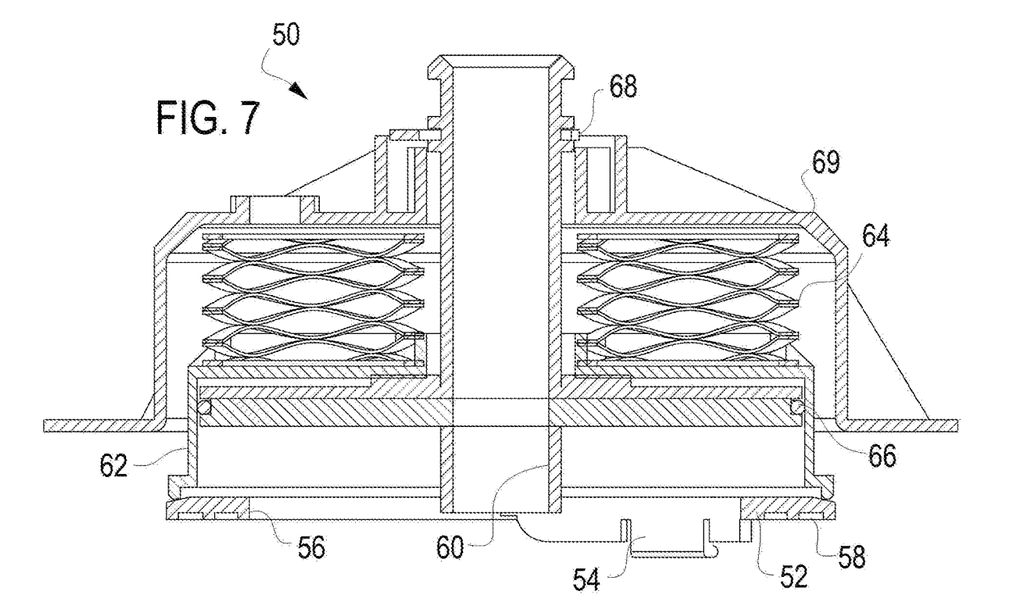
FIG. 7 is a side elevation section view of the bypass valve of FIG. 6.

The bypass valve 50 for the inside out flow filter assembly 20 is shown in FIGS. 6 and 7 in detail. The bypass valve 50 includes a bypass seat 52 with a universal alignment and coupling structure (including clips 54 and ridges 56 the same as on the end caps 30, and cooperating with the endcaps 30) around a central opening. As with the universal alignment and coupling structure discussed above this includes coupling clips 54 configured to engage with an adjacent universal alignment and coupling structure, clip ridge 56 configured to receive and engage with coupling clips 36 of an adjacent universal alignment and coupling structure of an adjacent endcap 30, and seal receiving surface 58 configured to receive a seal 42 around the central opening and around adjacent universal alignment and coupling structures. The bypass seat 52 includes a peripheral radial outlet and a central hollow stem 60 through which the tie rod 80 is received and upon which the bypass valve 50 can be assembled.

The bypass valve 50 includes an axially (wherein axial defines a direction along the axis of the tie bar 80 or the central hollow stem 60) cup shaped bypass dish 62 selectively closing the peripheral radial outlet of the seat 52, and having an annular bypass valve operational area upon which pressure within the filter assembly is acting on the bypass dish 62 to move the dish 62 from closing the peripheral radial outlet. The use of a narrow annular bypass valve operational area of about 2.86 in.$^2$ allows the force on springs 64 to be relatively light (compared with use of a larger effective area like the diameter face portion of the dish itself). This allows the springs 64 to be economical such that the springs 64 may be wave springs 64. The design accommodates a single wave spring 64 around the stem 60 or two outer spring sets on either side of the stem 60. An isolation radial seal 66 is provided between the seat 52 and an inner surface of the bypass dish 62. The small bypass dish area also results in a narrow sealing or contacting surface which is believed to form a better seal in operation. A bypass cover 69 is also provided which receives the springs 64 acting upon the cup shaped bypass dish 62 biasing the dish 62 toward selectively closing the peripheral radial outlet of the seat 52. A clip 68 on the stem 60 above the cover 69 can hold the bypass valve 50 together as a unit.

The bypass valve 50 for the inside out flow filter assembly 20 is shown in FIGS. 6 and 7 in detail. The bypass valve 52 includes a bypass seat 52 with a universal alignment and coupling structure (including clips 54 and ridges 56 the same as on the end caps 30, and cooperating with the endcaps 30) around a central opening. As with the universal alignment and coupling structure discussed above this includes coupling clips 54 configured to engage with an adjacent universal alignment and coupling structure, clip ridge 56 configured to receive and engage with coupling clips 36 of an adjacent universal alignment and coupling structure of an adjacent endcap 30, and seal receiving surface 58 configured to receive a seal 42 around the central opening and around adjacent universal alignment and coupling structures. The bypass seat 52 includes a peripheral radial outlet and a central hollow stem 60 through which the tie rod 80 is received and upon which the bypass valve 50 can be assembled.

The bypass valve 50 in the open bypass condition has a full opening of 0.50" in height. The radial circumference of the opening is such that the open area in the fully open position shown is the equivalent of a 3" diameter port.

Figure 8:
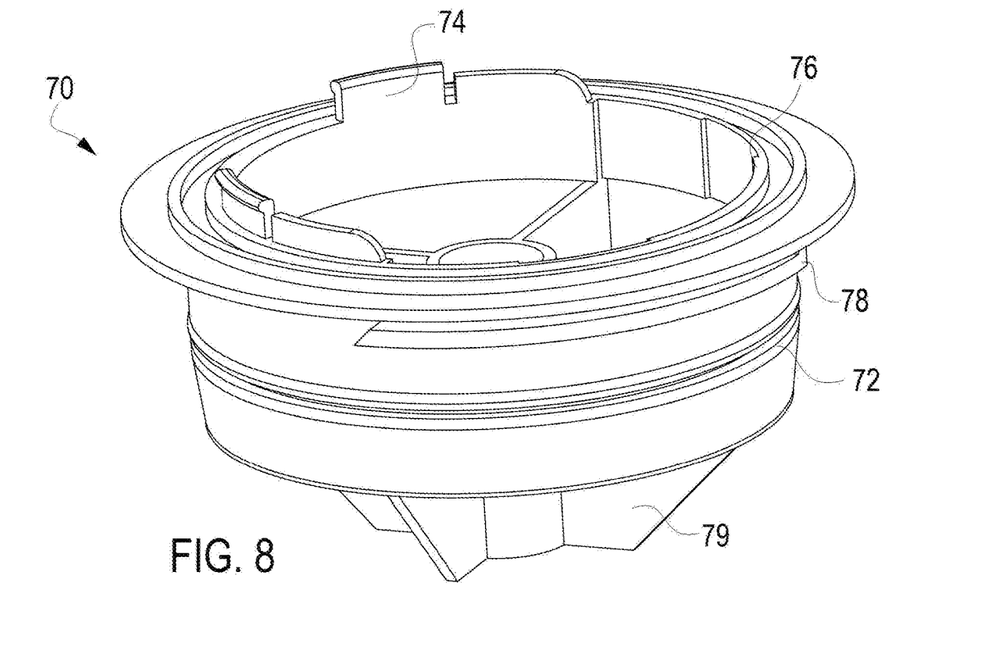
FIG. 8 is a perspective view of the tank bushing of the modular, low-profile inside out flow in-tank filter assembly of FIG. 1.

As discussed above the tank bushing 70 is coupled to the central opening of one endcap 30 of at least one filter element The tank bushing 70 is configured to mount the inside out flow in-tank filter assembly 20 to a return line 12 within a reservoir 10 beneath a top 14.

Figure 9:
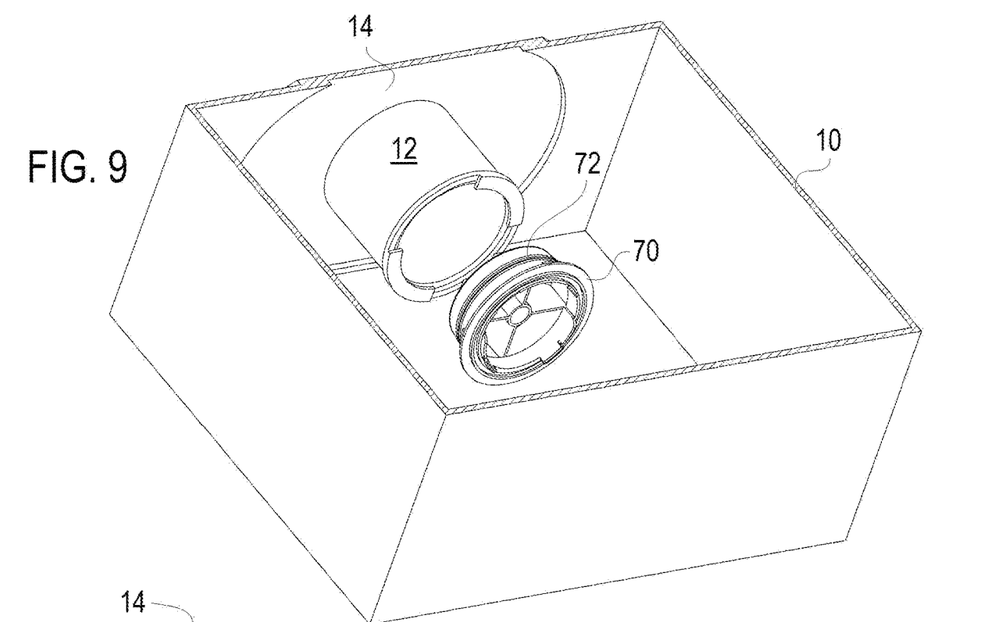
FIG. 9 is a perspective sectional exploded view showing the coupling of the tank bushing of the modular, low-profile inside out flow in-tank filter assembly according to one aspect of the invention mounted in a top inlet of a reservoir.

The tank bushing 70 includes a universal alignment and coupling structure around a central opening analogous to that discussed above and includes coupling clips 74 configured to engage with an adjacent universal alignment and coupling structure, clip ridge 76 configured to receive and engage with coupling clips 34 of an adjacent universal alignment and coupling structure, and seal receiving surface configured to receive a seal 42 around the central opening and between adjacent universal alignment and coupling structures. The tank bushing 70 includes an outer radial seal 72 configured to seal against the interior of the return line 12 within the reservoir. The tank bushing includes tapered guides 79 at a distal end thereof spaced from the endcap. The tank bushing 70 includes further including a bayonet style coupling 78 for attaching the assembly 20 to a top return line 12 within the reservoir 10, generally for suspending the assembly as shown in FIGS. 9-10.

The preferred embodiments described above are illustrative of the present invention and not restrictive hereof. It will be obvious that various changes may be made to the present invention without departing from the spirit and scope of the invention. The precise scope of the present invention is defined by the appended claims and equivalents thereto

What is claimed is:

1. A low-profile inside out flow in-tank filter assembly comprising:
    at least one filter element having spaced first and second endcaps each with a central opening therethrough and filter media extending between the endcaps, wherein at least one of i) a ratio of the circumference of each filter element to the total height of the filter element from an outer surface of one endcap to the outer surface of the other endcap is at least 10:1, and ii) the ratio of the effective surface area of the filter media to the effective height of the filter media is greater than or equal to 2500 cm$^2$/in;
    a tank bushing coupled to the central opening of one endcap of the at least one filter element, wherein the tank bushing is configured to mount the inside out flow in-tank filter assembly to a return line within a reservoir; and
    a bypass valve coupled to the central opening of one endcap of the at least one filter element, wherein the bypass valve is configured to allow flow to bypass the filter media of each of the at least one filter element.

2. The low-profile inside out flow in-tank filter assembly according to claim 1, wherein each endcap includes a universal alignment and coupling structure around the respective central opening, including coupling clips configured to engage with an adjacent universal alignment and coupling structure, a clip ridge configured to receive and engage with the coupling clips of an adjacent universal alignment and coupling structure, and a seal receiving surface configured to receive a seal around the respective central opening and between the adjacent universal alignment and coupling structures.

3. The low-profile inside out flow in-tank filter assembly according to claim 2, wherein the seal receiving surfaces of the adjacent universal alignment and coupling structures are aligned grooves for receiving a compressed seal therein.

4. The low-profile inside out flow in-tank filter assembly according to claim 2, wherein the tank bushing includes a universal alignment and coupling structure around a bushing central opening, including coupling clips configured to engage with an adjacent universal alignment and coupling structure, a clip ridge configured to receive and engage with the coupling clips of an adjacent universal alignment and coupling structure, and a seal receiving surface configured to receive a seal around the bushing central opening and between the adjacent universal alignment and coupling structures.

5. The low-profile inside out flow in-tank filter assembly according to claim 4, wherein the tank bushing includes an outer radial seal configured to seal against the interior of the return line within the reservoir.

6. The low-profile inside out flow in-tank filter assembly according to claim 5, wherein the tank bushing includes tapered guides at a distal end thereof spaced from the an adjacent endcap.

7. The low-profile inside out flow in-tank filter assembly according to claim 5, wherein the tank bushing includes a bayonet style coupling for attaching the assembly to the return line within the reservoir.

8. The low-profile inside out flow in-tank filter assembly according to claim 2, wherein the bypass valve includes a bypass seat with a universal alignment and coupling structure around a seat central opening, including coupling clips configured to engage with an adjacent universal alignment and coupling structure,
   a clip ridge configured to receive and engage with the coupling clips of an adjacent universal alignment and coupling structure, and a seal receiving surface configured to receive a seal around the seat central opening and between the adjacent universal alignment and coupling structures, and wherein the bypass seat includes a peripheral radial outlet.

9. The low-profile inside out flow in-tank filter assembly according to claim 8, wherein the bypass valve includes a cup shaped bypass dish selectively closing the peripheral radial outlet of the bypass seat, and having an annular bypass valve operational area upon which pressure within the filter assembly acts on the bypass dish to move the bypass dish from closing the peripheral radial outlet.

10. The low-profile inside out flow in-tank filter assembly according to claim 9, wherein the bypass valve includes a bypass cover and springs acting upon the cup shaped bypass dish biasing the bypass dish toward selectively closing the peripheral radial outlet of the bypass seat.

11. The low-profile inside out flow in-tank filter assembly according to claim 2, wherein the at least one filter element includes at least two of said filter elements, with the at least two filter elements coupled together.

12. The low-profile inside out flow in-tank filter assembly according to claim 2, further including a tie-rod extending through the center of the assembly with locknuts on each tie-rod end.

13. The low-profile inside out flow in-tank filter assembly according to claim 2, wherein each endcap is identical and is an oval shape having support ribs therein.

14. A modular inside out flow in-tank filter assembly comprising:
   at least one filter element having spaced first and second identical endcaps each with a central opening therethrough and filter media extending between the endcaps, wherein each endcap includes a universal alignment and coupling structure around the central opening, including coupling clips configured to engage with an adjacent universal alignment and coupling structure, a clip ridge configured to receive and engage with the coupling clips of an adjacent universal alignment and coupling structure, and a seal receiving surface configured to receive a seal around the respective central opening and between the adjacent universal alignment and coupling structures.

15. The modular inside out flow in-tank filter assembly according to claim 14, wherein each endcap is an oval shape and a ratio of the circumference of each filter element to the total height of the filter element from an outer surface of one endcap to the outer surface of the other endcap is at least 10:1.

16. The modular inside out flow in-tank filter assembly according to claim 14, wherein each endcap is an oval shape and a ratio of the circumference of each filter element to the total height of the filter element from an outer surface of one endcap to the outer surface of the other endcap is at least 12:1.

17. The modular inside out flow in-tank filter assembly according to claim 14, wherein each endcap is an oval shape and a ratio of the circumference of each filter element to the total height of the filter element from an outer surface of one endcap to the outer surface of the other endcap is about 16.

18. The modular inside out flow in-tank filter assembly according to claim 14, further including a tank bushing coupled to the central opening of one endcap of the at least one filter element, wherein the tank bushing is configured to mount the inside out flow in-tank filter assembly to a return line within a reservoir; and
   wherein the tank bushing includes a universal alignment and coupling structure around a bushing central opening, including coupling clips configured to engage with an adjacent universal alignment and coupling structure, a clip ridge configured to receive and engage with coupling clips of an adjacent universal alignment and coupling structure, and a seal receiving surface configured to receive a seal around the bushing central opening and between the adjacent universal alignment and coupling structures,
   and wherein the tank bushing includes an outer radial seal configured to seal against the interior of the return line within the reservoir.

19. The modular inside out flow in-tank filter assembly according to claim 14, further including a bypass valve assembly coupled to the central opening of one endcap of the at least one filter element, wherein the bypass valve is configured to allow flow to bypass the filter media of each of the at least one filter element, wherein the bypass valve assembly includes a bypass seat with a universal alignment and coupling structure around a bypass central opening, including coupling clips configured to engage with an adjacent universal alignment and coupling structure, a clip ridge configured to receive and engage with coupling clips of an adjacent universal alignment and coupling structure, and a seal receiving surface configured to receive a seal around the bypass central opening and between the adjacent universal alignment and coupling structures, wherein the bypass seat includes a peripheral radial outlet, and wherein the bypass valve assembly includes a cup shaped bypass dish selectively closing the peripheral radial outlet of the bypass seat, and having an annular bypass valve operational area upon which pressure within the filter assembly acts on the bypass dish to move the bypass dish from closing the peripheral radial outlet.

20. A bypass valve for an inside out flow filter assembly comprising:
 a bypass seat with a universal alignment and coupling structure around a bypass central opening, including coupling clips configured to engage with an adjacent universal alignment and coupling structure, a clip ridge configured to receive and engage with coupling clips of an adjacent universal alignment and coupling structure, and a seal receiving surface configured to receive a seal around the bypass central opening and between the adjacent universal alignment and coupling structures, and wherein the bypass seat includes a peripheral radial outlet;
 a cup shaped bypass dish closing the peripheral radial outlet of the bypass seat, and having an annular bypass valve operational area upon which pressure within the filter assembly acts on the bypass dish to move the bypass dish from closing the peripheral radial outlet;
 a bypass cover; and
 springs that act upon the cup shaped bypass dish biasing the bypass dish toward closing the peripheral radial outlet of the seat.

\* \* \* \* \*